(12) United States Patent
Abedini et al.

(10) Patent No.: US 10,772,078 B2
(45) Date of Patent: Sep. 8, 2020

(54) TECHNIQUES AND APPARATUSES FOR SYNCHRONIZATION SIGNAL RESOURCE SELECTION FOR A WIRELESS BACKHAUL NETWORK

(71) Applicant: QUALCOMM Incorporated, San Diego (CA)

(72) Inventors: Navid Abedini, Raritan, NJ (US); Muhammad Nazmul Islam, Edison, NJ (US); Sundar Subramanian, San Diego, CA (US); Karl Georg Hampel, Hoboken, NJ (US); Juergen Cezanne, Ocean Township, NJ (US); Junyi Li, Chester, NJ (US)

(73) Assignee: Qualcomm Incorporated, San Diego, CA (US)

( * ) Notice: Subject to any disclaimer, the term of this patent is extended or adjusted under 35 U.S.C. 154(b) by 31 days.

(21) Appl. No.: 15/945,663

(22) Filed: Apr. 4, 2018

(65) Prior Publication Data

US 2018/0359728 A1 Dec. 13, 2018

Related U.S. Application Data

(60) Provisional application No. 62/517,021, filed on Jun. 8, 2017.

(51) Int. Cl.
*H04W 72/04* (2009.01)
*H04W 56/00* (2009.01)

(52) U.S. Cl.
CPC ....... *H04W 72/04* (2013.01); *H04W 56/0005* (2013.01)

(58) Field of Classification Search
None
See application file for complete search history.

(56) References Cited

U.S. PATENT DOCUMENTS

| | | | |
|---|---|---|---|
| 9,519,490 B2 * | 12/2016 | Vanturennout | G06F 9/4406 |
| 9,674,735 B2 | 6/2017 | Neves et al. | |
| 9,749,821 B1 * | 8/2017 | Gupta | H04W 4/14 |
| 2010/0057923 A1 * | 3/2010 | Petter | G06F 9/5061 709/229 |
| 2012/0207021 A1 * | 8/2012 | Rahman | H04L 41/0896 370/235 |
| 2013/0085679 A1 * | 4/2013 | Budiman | G06F 19/3468 702/19 |
| 2014/0017990 A1 * | 1/2014 | Kakadia | H04W 36/14 455/7 |
| 2015/0146620 A1 * | 5/2015 | Phan | H04W 76/14 370/328 |
| 2015/0215833 A1 * | 7/2015 | Siomina | H04W 36/08 455/436 |

(Continued)

*Primary Examiner* — Nicholas Sloms
(74) *Attorney, Agent, or Firm* — Harrity & Harrity, LLP

(57) ABSTRACT

Certain aspects of the present disclosure generally relate to wireless communication. A wireless node may determine a connectivity state of the wireless node with respect to a wireless network, may determine a set of resources available for one or more synchronization communications based at least in part on the connectivity state, may select one or more resources from the set of resources, and may transmit the one or more synchronization communications using the one or more resources. Numerous other aspects are provided.

30 Claims, 10 Drawing Sheets

(56) References Cited

U.S. PATENT DOCUMENTS

| | | | |
|---|---|---|---|
| 2015/0230160 A1* | 8/2015 | Lin | H04W 76/18 |
| | | | 370/252 |
| 2015/0327191 A1* | 11/2015 | Park | H04W 56/00 |
| | | | 370/350 |
| 2015/0327201 A1* | 11/2015 | He | H04W 48/16 |
| | | | 370/336 |
| 2016/0037549 A1* | 2/2016 | Seo | H04W 76/14 |
| | | | 370/329 |
| 2016/0100408 A1* | 4/2016 | Hedayat | H04L 5/0053 |
| | | | 370/329 |
| 2016/0143039 A1 | 5/2016 | Baldemair et al. | |
| 2016/0227495 A1* | 8/2016 | Lee | H04W 56/00 |
| 2016/0270012 A1* | 9/2016 | Chen | H04W 76/10 |
| 2016/0295613 A1 | 10/2016 | Wager et al. | |
| 2017/0013573 A1 | 1/2017 | Jung et al. | |
| 2017/0331670 A1* | 11/2017 | Parkvall | H04W 52/0245 |
| 2017/0332155 A1* | 11/2017 | Branch | H04W 76/19 |
| 2017/0351841 A1* | 12/2017 | Moskal | A61B 5/0031 |
| 2017/0366313 A1 | 12/2017 | Rahman et al. | |
| 2018/0049112 A1* | 2/2018 | Wang | G01S 5/0242 |
| 2018/0139794 A1* | 5/2018 | Chae | H04W 40/12 |
| 2018/0184390 A1* | 6/2018 | Wu | H04W 4/70 |
| 2018/0323922 A1* | 11/2018 | Lindoff | H04W 56/001 |

\* cited by examiner

TECHNIQUES AND APPARATUSES FOR SYNCHRONIZATION SIGNAL RESOURCE SELECTION FOR A WIRELESS BACKHAUL NETWORK

CROSS-REFERENCE TO RELATED APPLICATIONS UNDER 35 U.S.C. 119

This application claims priority U.S. Provisional Patent Application No. 62/517,021, filed Jun. 8, 2017, entitled "TECHNIQUES AND APPARATUSES FOR SYNCHRONIZATION SIGNAL RESOURCE SELECTION FOR A WIRELESS BACKHAUL NETWORK," which is hereby expressly incorporated by reference herein.

INTRODUCTION

Aspects of the present disclosure generally relate to wireless communication, and more particularly to techniques and apparatuses for synchronization signal resource selection for a wireless backhaul network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), and New Radio (NR).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in L 1E and NR technologies. Preferably, these improvements should be applicable to other multiple access technologies and the telecommunication standards that employ these technologies.

SUMMARY

In some aspects, a method for wireless communication may include determining, by a wireless node, a connectivity state of the wireless node with respect to a wireless network; determining, by the wireless node, a set of resources available for one or more synchronization communications based at least in part on the connectivity state; selecting, by the wireless node, one or more resources from the set of resources; and transmitting, by the wireless node, the one or more synchronization communications using the one or more resources.

In some aspects, a wireless node for wireless communication may include a memory and one or more processors operatively coupled to the memory. The one or more processors may be configured to determine a connectivity state of the wireless node with respect to a wireless network; determine a set of resources available for one or more synchronization communications based at least in part on the connectivity state; select one or more resources from the set of resources; and transmit the one or more synchronization communications using the one or more resources.

In some aspects, an apparatus for wireless communication may include means for determining a connectivity state of the apparatus with respect to a wireless network; means for determining a set of resources available for one or more synchronization communications based at least in part on the connectivity state; means for selecting one or more resources from the set of resources; and means for transmitting the one or more synchronization communications using the one or more resources.

In some aspects, a non-transitory computer-readable medium may include one or more instructions for wireless communication. The one or more instructions, when executed by one or more processors, may cause the one or more processors to determine a connectivity state of a wireless node with respect to a wireless network; determine a set of resources available for one or more synchronization communications based at least in part on the connectivity state; select one or more resources from the set of resources; and transmit the one or more synchronization communications using the one or more resources.

Aspects generally include a method, a wireless node, an apparatus, a non-transitory computer-readable medium, a computer program product, a user equipment, and a base station as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
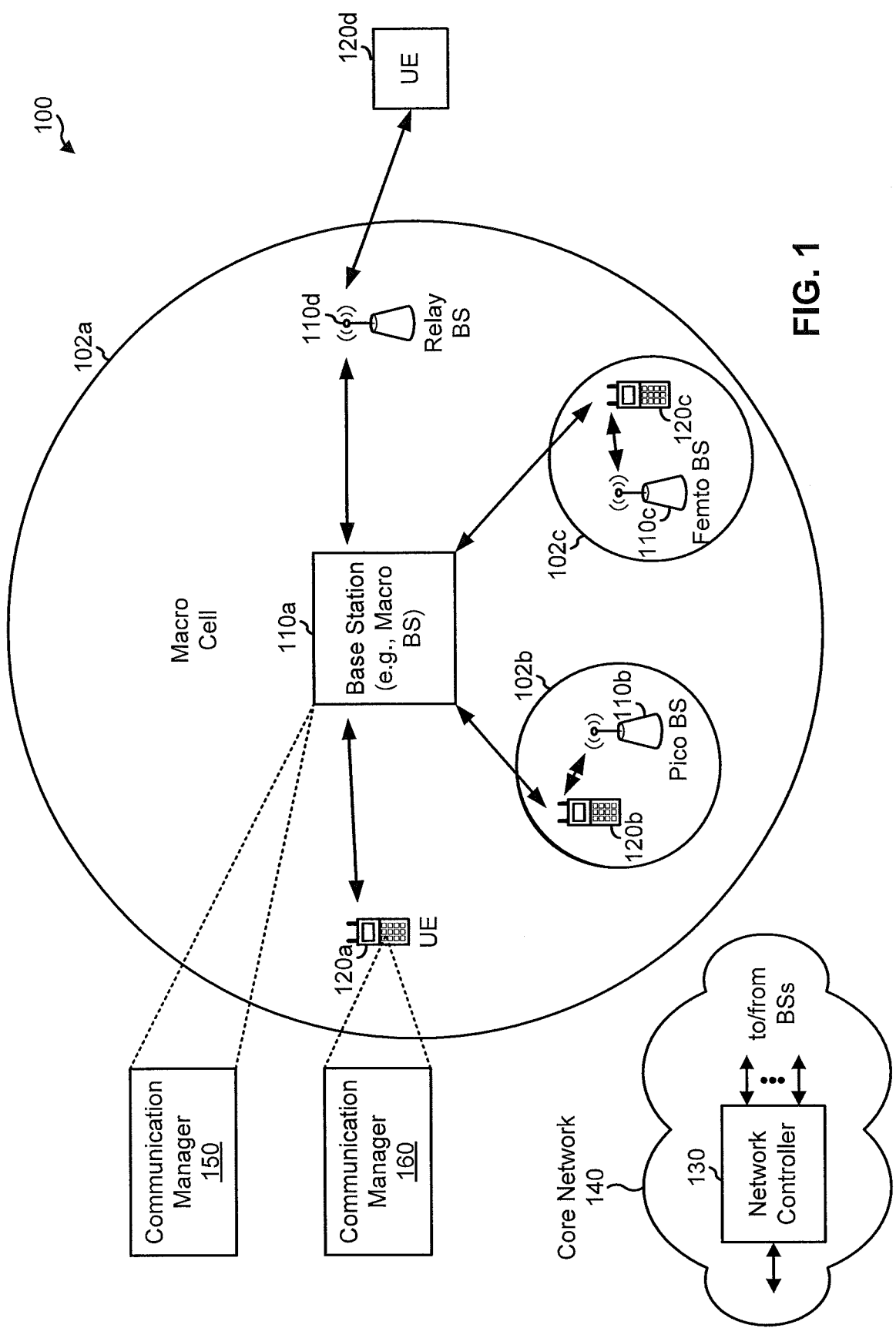
FIG. 1 is a block diagram conceptually illustrating an example of a wireless communication network, in accordance with various aspects of the present disclosure.

A wireless backhaul network may be deployed to provide connectivity to a core network. In a wireless backhaul network, an anchor base station may communicate with the core network via a wired connection (e.g., a fiber connection), and non-anchor base stations may communicate with the anchor base station via wireless links. In some cases, a chain of non-anchor base stations may communicate via wireless links along the chain to form a path to the anchor base station and the core network. Additionally, or alternatively, a single base station may communicate wirelessly with multiple other base stations, forming a mesh network.

A wireless backhaul network may permit simple and cheap deployment of additional base stations because the base stations may be able to detect one another automatically and be deployed without expensive infrastructure, such as wired connections. Furthermore, network resources (e.g., frequency resources, time resources, and/or the like) may be shared between wireless access links (e.g., between a base station and a UE or between UEs) and wireless backhaul links (e.g., between base stations), thereby enhancing wireless link capacity and reducing network latency. In some cases, the base stations and/or UEs may utilize millimeter waves and/or directional communications (e.g., beamforming, precoding, and/or the like) for the wireless links to reduce inter-link interference.

To support automatic deployment of new base stations, a deployed base station may periodically transmit synchronization communications, such as one or more synchronization signals (e.g., a primary synchronization signal (PSS), a secondary synchronization signal (SSS), and/or the like) and/or one or more synchronization channels (e.g., a physical broadcast channel (PBCH), via which a demodulation reference signal (DMRS) and/or other synchronization signals may be transmitted). A new base station may detect a synchronization communication from a deployed base station, and may use the synchronization communication to determine time synchronization, frequency synchronization, and/or other system information for establishing a wireless connection with the deployed base station (e.g., using an access procedure, such as a random access procedure). In this way, the new base station may be able to automatically connect to a deployed base station, thereby simplifying deployment of new base stations.

However, such automatic deployment may be complicated when a new base station detects multiple deployed base stations and has multiple options for establishing connections with different base stations. In some cases, it may be more useful for the new base station to connect to a first base station, such as a connected base station that has a direct or indirect connection to a core network, and it may be less useful for the new base station to connect to a second base station, such as an isolated base station that does not have a direct or indirect connection to a core network. Thus, a base station may indicate a connectivity state of the base station to support decision-making by new base stations during automatic deployment, as described in more detail herein.

Furthermore, when a wireless network includes some base stations that are not in communication with one another, such lack of communication may lead to interference between base stations communications. For example, base stations that are not in communication with one another may use the same resources (e.g., time resources and/or frequency resources) to transmit synchronization signals, which may result in signal collision and interference. To reduce such interference, orthogonal (e.g., non-overlapping) resources may be used for transmission of synchronization communications. Aspects described herein allocate resources to a base station based at least in part on a connectivity state of the base station, thereby increasing orthogonality of resources used for synchronization communications and reducing interference. Additional details are described elsewhere herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Using the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be a 5G or NR network or some other wireless network, such as an L 1E network. Wireless network 100 may include a number of base stations (BSs) 110 (shown as BS 110a, BS 110b, BS 110c, and BS 110d) and other network entities. A BS is an entity that communicates with user equipment (UEs) and/or other BSs, and may also be referred to as a Node B, an eNB, a gNB, a NR BS, a 5G NB, an access point, a transmit receive point (TRP), an access node (AN), and/or the like. Each BS may provide communication coverage for a particular geographic area. In 3GPP, the term "cell" can refer to a coverage area of a BS and/or a BS subsystem serving this coverage area, depending on the context in which the term is used. As used herein, the term "wireless node" may refer to a base station and/or a user equipment.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, a wireless link (e.g., a wireless backhaul link), and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may be implemented in a core network 140.

Core network 140 may include one or more devices to communicate with and/or control BSs 110 and/or one or more devices to route packets through core network 140 to one or more other networks. For example, core network 140 may include a mobility management entity (MME), a serving gateway (SGW), a packet data network (PDN) gateway (PGW), a home subscriber server (HSS), a policy charging and rules function (PCRF) device, an authentication, authorization, and accounting (AAA) server, and/or the like.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) UEs and/or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. MTC UEs, as well as other types of UEs, may be implemented as narrowband internet of things (NB-IoT) devices. UE 120 may be included inside a housing that houses components of UE 120, such as processor components, memory components, and/or the like. As used herein, the term "wireless node" may refer to a BS 110 and/or a UE 120.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

As shown in FIG. 1, base station 110 may include a communication manager 150. As described in more detail elsewhere herein, communication manager 150 may determine a connectivity state of a wireless node (e.g., base station 110) with respect to a wireless network, may determine a set of resources available for one or more synchronization communications based at least in part on the connectivity state, may select one or more resources from the set of resources, may transmit the one or more synchronization communications using the one or more resources, and/or may perform one or more other operations described herein. Communication manager 150 may include one or more components of FIG. 2, as described below.

Similarly, UE 120 may include a communication manager 160. As described in more detail elsewhere herein, communication manager 160 may determine a connectivity state of a wireless node (e.g., UE 120) with respect to a wireless network, may determine a set of resources available for one or more synchronization communications based at least in part on the connectivity state, may select one or more resources from the set of resources, may transmit the one or more synchronization communications using the one or more resources, and/or may perform one or more other operations described herein. Communication manager 160 may include one or more components of FIG. 2, as described below.

As indicated above, FIG. 1 is provided as an example. Other examples are possible and may differ from what was described with regard to FIG. 1.

Figure 2:
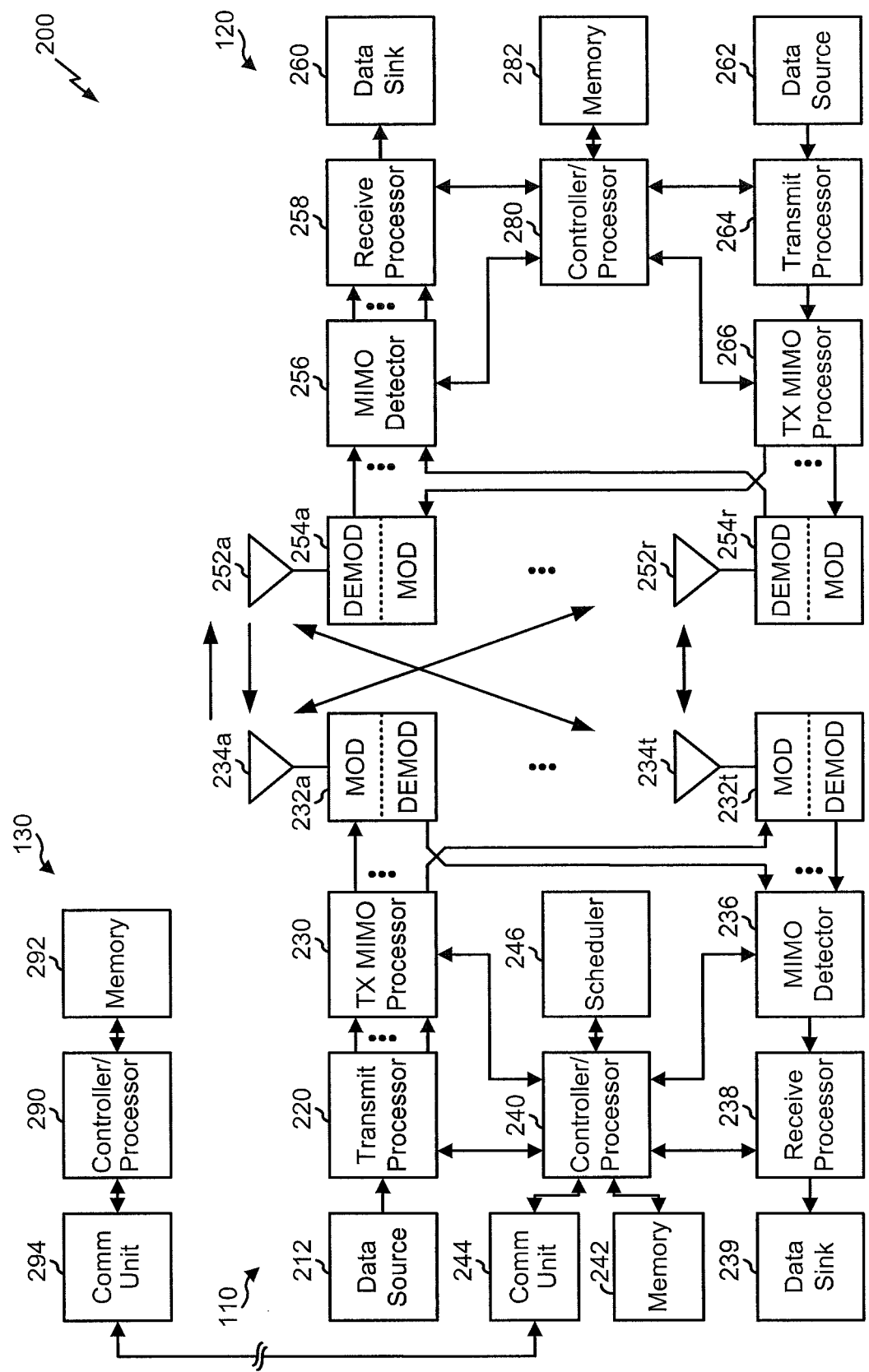
FIG. 2 shows a block diagram conceptually illustrating an example of a base station in communication with a user equipment (UE) in a wireless communication network, in accordance with various aspects of the present disclosure.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., DMRS, CRS, and/or the like) and synchronization signals (e.g., a PSS, an SSS, and/or the like).

A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292. Memories 242 and 282 may store data and program codes for base station 110 and UE 120, respectively. A scheduler 246 may schedule UEs for data transmission on the downlink and/or uplink.

In some aspects, one or more components of UE 120 may be included in a housing. Controllers/processors 240 and 280 and/or any other component(s) in FIG. 2 may direct the operation at base station 110 and UE 120, respectively, to perform operations associated with synchronization signal resource selection, as described in more detail elsewhere herein. For example, controller/processor 240 and/or other processors and modules at base station 110 and/or UE 120, may perform or direct operations of base station 110 and/or UE 120 to perform one or more operations associated with determining a connectivity state of a wireless node (e.g., base station 110 and/or UE 120) with respect to a wireless network, determining a set of resources available for one or more synchronization communications based at least in part on the connectivity state, selecting one or more resources from the set of resources, and/or transmitting the one or more synchronization communications using the one or more resources. For example, controller/processor 240 and/or other controllers/processors and modules at base station 110 and/or UE 120 may perform or direct operations of, for example, process 800 of FIG. 8 and/or other processes described herein. In some aspects, one or more of the components shown in FIG. 2 may be employed to perform example process 800 and/or other processes for the techniques described herein.

Additionally, or alternatively, base station 110 and/or UE 120 may include means for determining a connectivity state of a wireless node with respect to a wireless network, means for determining a set of resources available for one or more synchronization communications based at least in part on the connectivity state, means for selecting one or more resources from the set of resources, means for transmitting the one or more synchronization communications using the one or more resources, and/or means for performing other operations described herein. Such means may include one or more components shown in FIG. 2. Additionally, or alternatively, communication manager 150 and/or communication manager 160 may include one or more components shown in FIG. 2.

As indicated above, FIG. 2 is provided as an example. Other examples are possible and may differ from what was described with regard to FIG. 2.

Figure 3A:
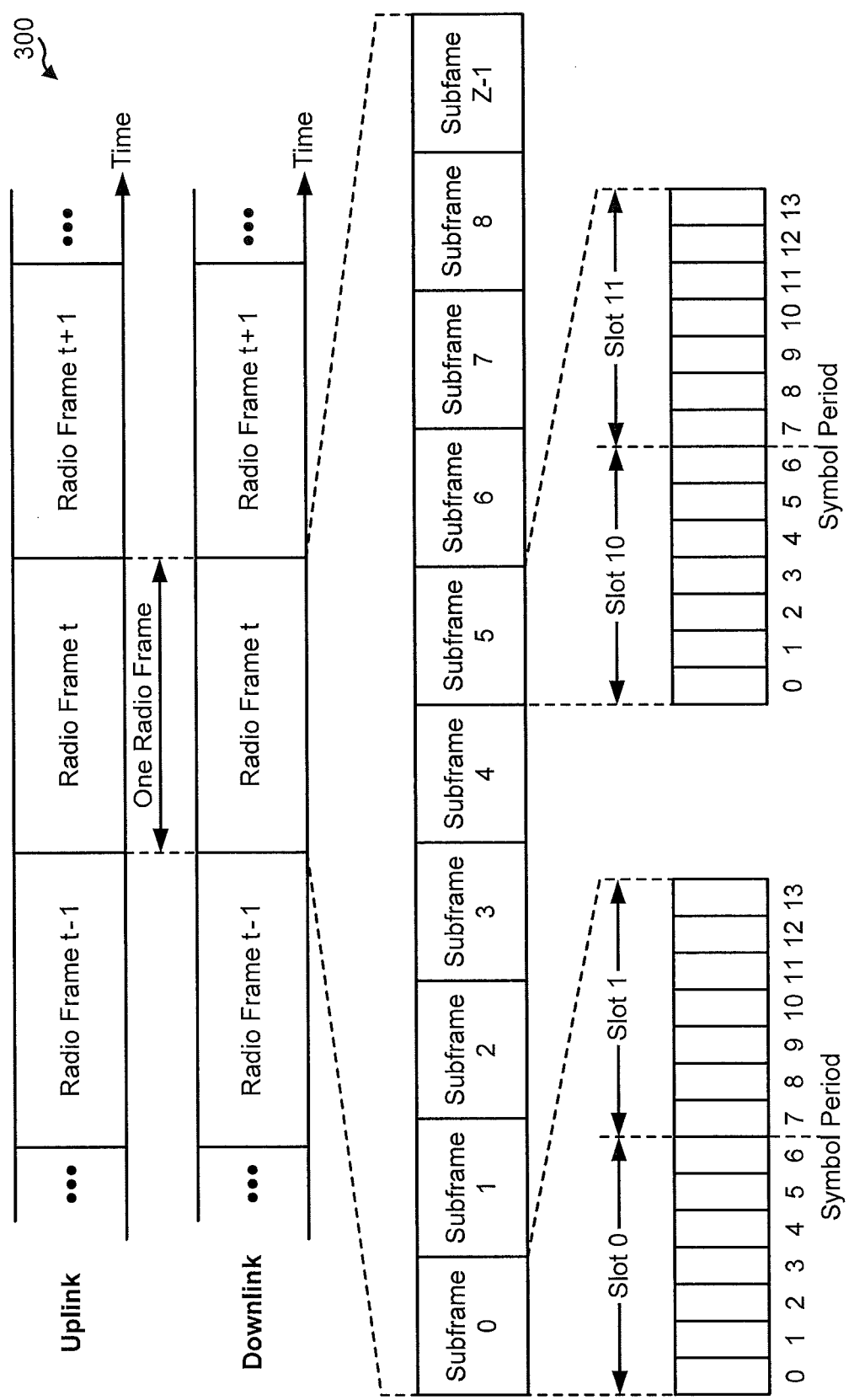
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a BS may transmit synchronization signals (e.g., a primary synchronization signal (PSS), a secondary synchronization signal (SSS), and/or the like) on the downlink for each cell supported by the BS. The PSS and SSS may be used by UEs for cell search and acquisition, and/or may be used by other BSs for automatic deployment in a wireless backhaul network. For example, the PSS may be used by UEs and/or BSs to determine symbol timing, and the SSS may be used by UEs and/or BSs to determine a physical cell identifier, associated with the BS, and frame timing. The BS may also transmit a physical broadcast channel (PBCH). The PBCH may carry some system information, such as system information that supports initial access by UEs and/or BSs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
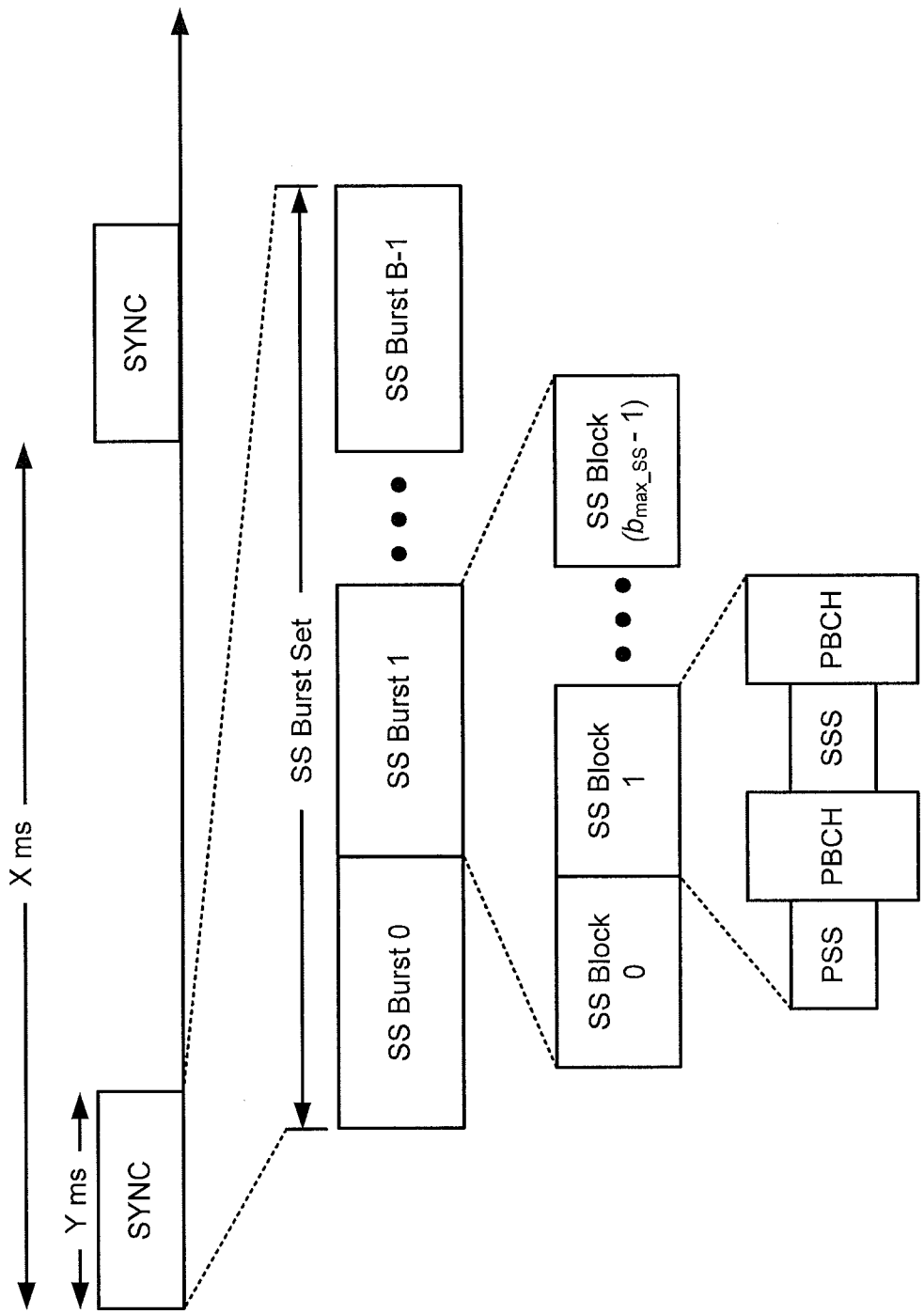
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst. In some aspects, different SS blocks may be beam-formed differently. An SS burst set may be periodically transmitted by a wireless node, such as every X milliseconds, as shown in FIG. 3B. Additionally, or alternatively, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a BS-SS may include different information than a UE-SS. For example, one or more BS-SSs may exclude PBCH communications. Additionally, or alternatively, a BS-SS and a UE-SS may differ with respect to one or more of a time resource used for transmission or reception of the SS, a frequency resource used for transmission or reception of the SS, a periodicity of the SS, a waveform of the SS, a beamforming parameter used for transmission or reception of the SS, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the BS according to the burst period. In other words, the SS blocks may be repeated during each SS burst. In some aspects, the SS burst set may have a burst set periodicity, whereby the SS bursts of the SS burst set are transmitted by the BS according to the fixed burst set periodicity. In other words, the SS bursts may be repeated during each SS burst set.

The BS may transmit system information, such as system information blocks (SIBS) on a physical downlink shared channel (PDSCH) in certain subframes. The BS may transmit control information/data on a physical downlink control channel (PDCCH) in B symbol periods of a subframe, where B may be configurable for each subframe. The BS may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
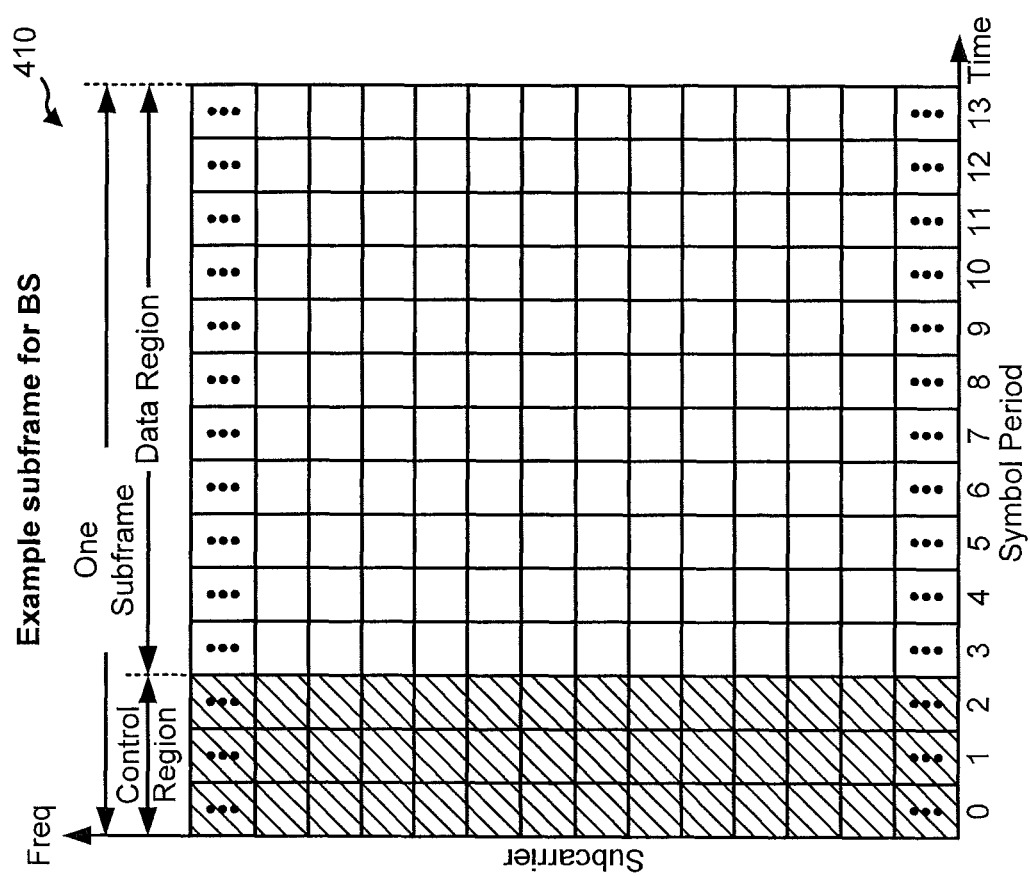
FIG. 4 is a block diagram conceptually illustrating an example subframe formats with a normal cyclic prefix, in accordance with various aspects of the present disclosure.

FIG. 4 shows an example subframe format 410 with a normal cyclic prefix. The available time frequency resources may be partitioned into resource blocks. Each resource block may cover 12 subcarriers in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using IDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 ms duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
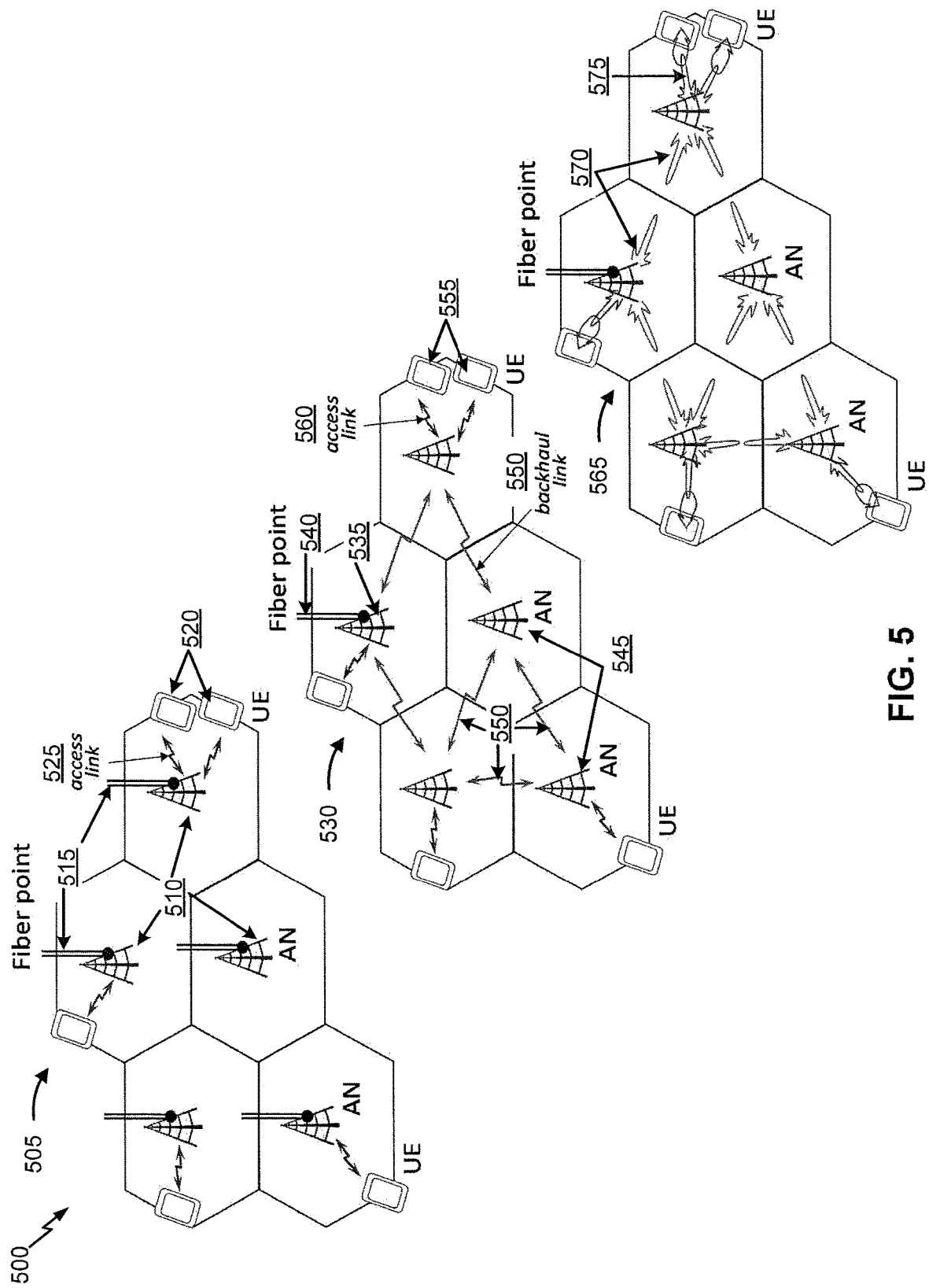
FIG. 5 is a diagram illustrating examples of radio access networks, in accordance with various aspects of the present disclosure.

FIG. 5 is a diagram illustrating examples 500 of radio access networks, in accordance with various aspects of the disclosure.

As shown by reference number 505, a traditional (e.g., 3G, 4G, LTE, etc.) radio access network may include multiple base stations 510 (e.g., access nodes (AN)), where each base station 510 communicates with a core network via a wired backhaul link 515, such as a fiber connection. A base station 510 may communicate with a UE 520 via an access link 525, which may be a wireless link. In some aspects, a base station 510 shown in FIG. 5 may correspond to a base station 110 shown in FIG. 1. Similarly, a HE 520 shown in FIG. 5 may correspond to a UE 120 shown in FIG. 1.

As shown by reference number 530, a radio access network may include a wireless backhaul network, where at least one base station is an anchor base station 535 that communicates with a core network via a wired backhaul link 540, such as a fiber connection. The wireless backhaul network may include one or more non-anchor base stations 545 that communicate directly with or indirectly with (e.g., via one or more non-anchor base stations 545) the anchor base station 535 via one or more backhaul links 550 to form a backhaul path to the core network for carrying backhaul traffic. Backhaul link 550 may be a wireless link. Anchor base station(s) 535 and/or non-anchor base station(s) 545 may communicate with one or more UEs 555 via access links 560, which may be wireless links for carrying access traffic. In some aspects, an anchor base station 535 and/or a non-anchor base station 545 shown in FIG. 5 may correspond to a base station 110 shown in FIG. 1. Similarly, a UE 555 shown in FIG. 5 may correspond to a UE 120 shown in FIG. 1.

As shown by reference number 565, in some aspects, a radio access network that includes a wireless backhaul network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 570 between base stations may use millimeter waves to carry information and/or may be directed toward a target base station using beamforming, precoding, and/or the like. Similarly, the wireless access links 575 between a UE and a base station may use millimeter waves and/or may be directed toward a target wireless node (e.g., a UE and/or a base station). In this way, inter-link interference may be reduced.

The configuration of base stations and UEs in FIG. 5 is shown as an example, and other examples are possible. For example, one or more base stations illustrated in FIG. 5 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 5 is provided as an example. Other examples are possible and may differ from what was described with regard to FIG. 5.

Figure 6:
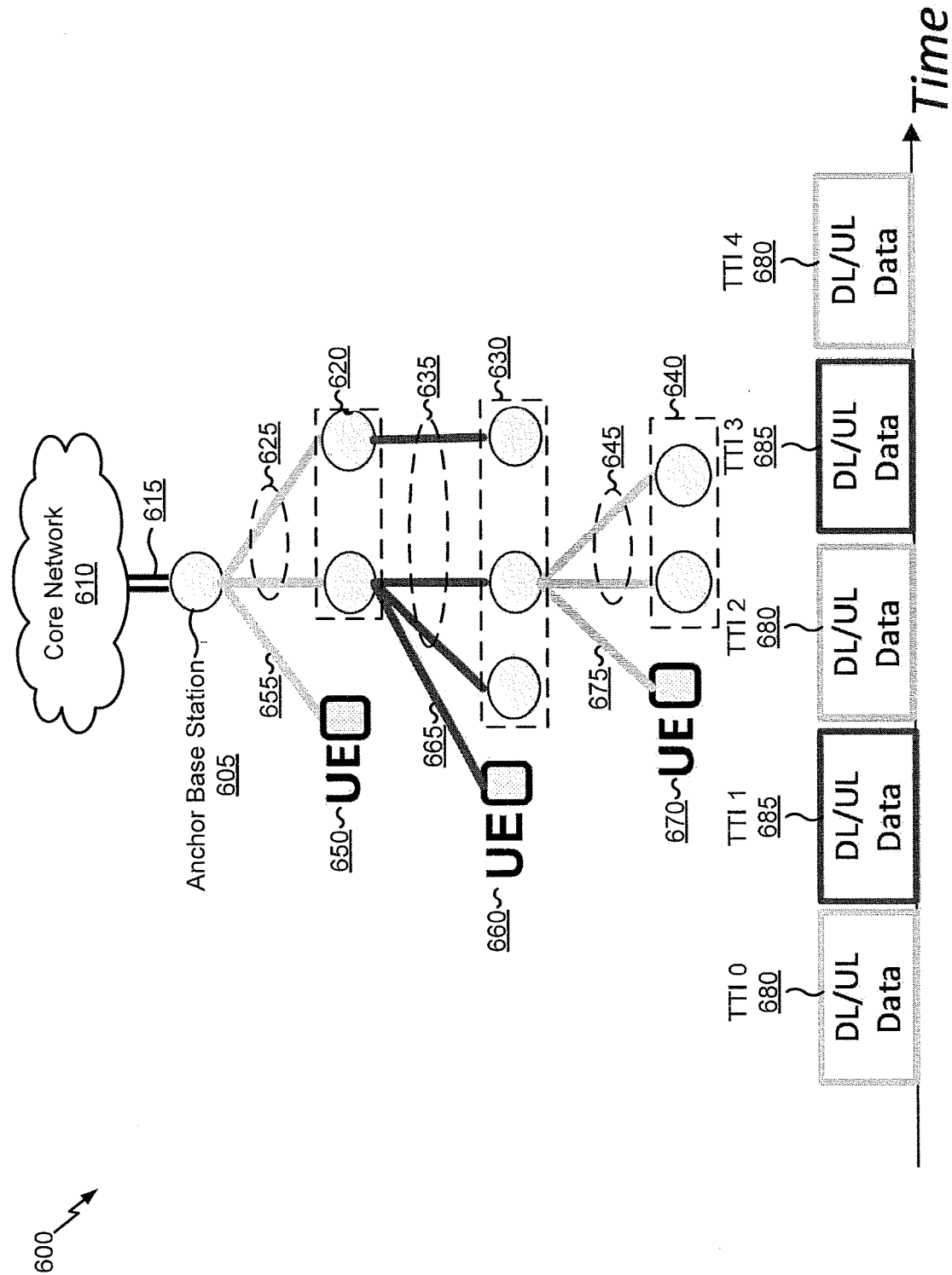
FIG. 6 is a diagram illustrating an example of resource partitioning in a wireless backhaul network, in accordance with various aspects of the present disclosure.

FIG. 6 is a diagram illustrating an example 600 of resource partitioning in a wireless backhaul network, in accordance with various aspects of the disclosure.

As shown in FIG. 6, an anchor base station 605 may be connected to a core network 610 via a wired backhaul link 615, such as a fiber connection. As further shown, non-anchor base stations 620 may communicate directly with anchor base station 605 via wireless backhaul links 625. In some aspects, one or more non-anchor base stations may communicate indirectly with anchor base station 605 via multiple wireless backhaul links (e.g., via one or more other non-anchor base stations). For example, and as shown, a first set of non-anchor base stations 630 may communicate indirectly with anchor base station 605 via a wireless backhaul link 635 and a wireless backhaul link 625. As further shown, a second set of non-anchor base stations 640 may communicate indirectly with anchor base station 605 via a wireless backhaul link 645, a wireless backhaul link 635, and a wireless backhaul link 625.

As further shown, a UE 650 may communicate with anchor base station 605 via a wireless access link 655, a UE 660 may communicate with a non-anchor base station 620 via a wireless access link 665, and a UE 670 may communicate with a non-anchor base station 630 via a wireless access link 675.

In some aspects, an index (e.g., a color index) may be assigned to a wireless link and/or a wireless node (e.g., a base station or a UE). The index may indicate one or more resources allocated to a wireless node for communication via the wireless link. For example, and as shown, a first index 680 may be associated with transmission time intervals (TTIs) 0, 2, and 4, and a second index 685 may be associated with TTIs 1 and 3. As indicated by light gray lines in FIG. 6, the first index 680 may be assigned to wireless backhaul links 625 and 645 and wireless access links 655 and 675. Thus, information may be transmitted over these links during TTIs 0, 2, and 4, and not during TTIs 1 and 3. Similarly, and as indicated by dark gray lines in FIG. 6, the second index 685 may be assigned to wireless backhaul links 635 and wireless access links 665 Thus, information may be transmitted over these links during TTIs 1 and 3, and not during TTIs 0, 2, and 4. In this way, wireless nodes may coordinate communication such that a wireless node is not configured to transmit and receive data at the same time.

While the resources are shown as time resources, additionally, or alternatively, an index may be associated with a frequency resource. Furthermore, the configuration of base stations and UEs in FIG. 6 is shown as an example, and other examples are possible. For example, the base stations illustrated in FIG. 6 may be replaced by UEs that communicate via a UE-to-UE access network (e.g., a peer-to-peer network, a device-to-device network, and/or the like). In this case, an anchor node may refer to a UE that is directly in communication with a base station (e.g., a base station that provides access to a core network).

As indicated above, FIG. 6 is provided as an example. Other examples are possible and may differ from what was described with regard to FIG. 6.

Figure 7A:
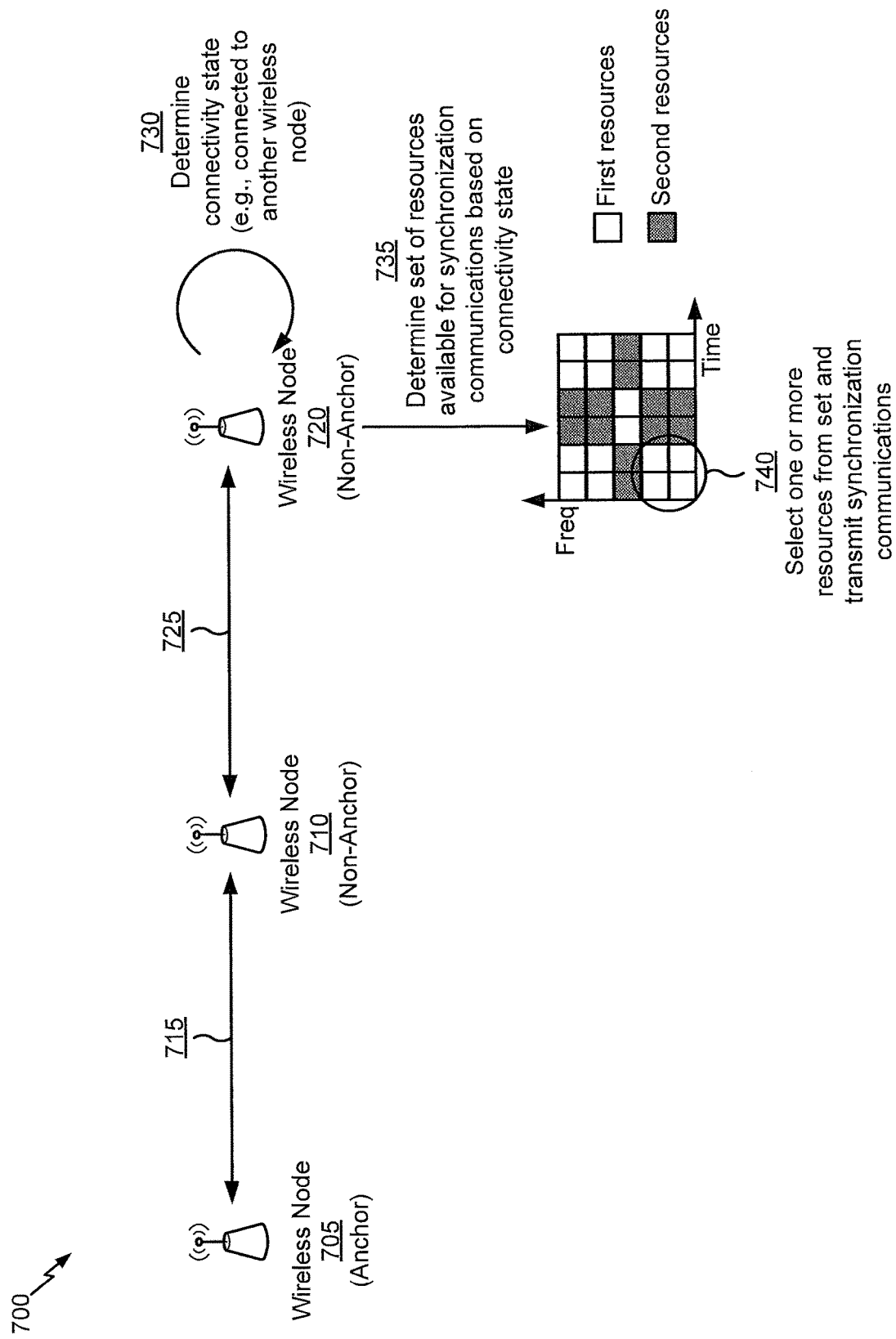
FIGS. 7A and 7B are diagrams illustrating examples of synchronization signal resource selection for a wireless backhaul network, in accordance with various aspects of the present disclosure.
Figure 7B:
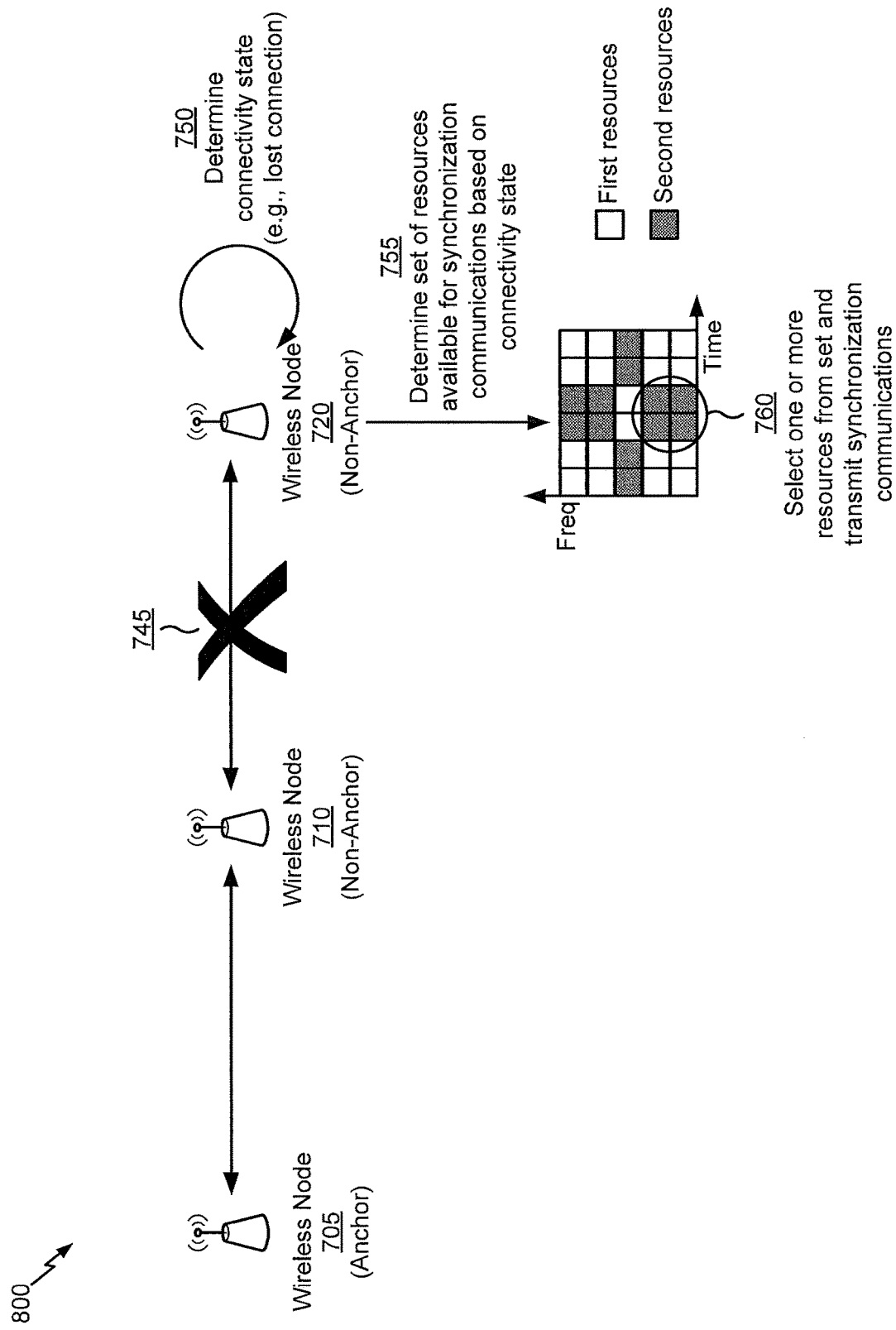

FIGS. 7A and 7B are diagrams illustrating examples 700 of synchronization signal resource selection for a wireless backhaul network, in accordance with various aspects of the present disclosure.

As shown in FIG. 7A, a wireless anchor node 705 may communicate with a first wireless non-anchor node 710 via a first wireless backhaul link 715, and the first wireless non-anchor node 710 may communicate with a second wireless non-anchor node 720 via a second wireless backhaul link 725. In some aspects, one or more wireless nodes 705, 710, and/or 720 may communicate using millimeter waves. In some aspects, one or more of the wireless nodes 705, 710, 720 may be base stations acting as access points to a core network, such as one or more of the base stations described elsewhere herein in connection with FIGS. 1, 2, 5, and/or 6. Additionally, or alternatively, one or more of the wireless nodes 705, 710, 720 may be UEs acting as access points to a core network (e.g., via a UE-to-UE network, a device-to-device network, a peer-to-peer network, and/or the like), such as one or more of the UEs described elsewhere herein in connection with FIGS. 1, 2, 5, and/or 6.

As shown by reference number 730, wireless node 720 may determine a connectivity state of wireless node 720. The connectivity state may be a state of wireless node 720 with respect to a wireless network (e.g., a wireless backhaul network). In some aspects, the connectivity state may indicate a state of a connection between the wireless node 720 and one or more other wireless nodes. Additionally, or alternatively, the connectivity state may indicate one or more parameters associated with such a connection. As an example, the connectivity state of wireless node 720 may indicate that wireless node 720 is connected to at least one other wireless node (e.g., wireless node 710) via a wireless link of the wireless network. Other connectivity states are possible, and will be described in more detail elsewhere herein.

As shown by reference number 735, wireless node 720 may determine a set of resources available for one or more synchronization communications based at least in part on the connectivity state of wireless node 720. As described elsewhere herein in connection with FIG. 3B, a synchronization communication may include one or more of a PSS, an SSS, a PBCH communication, and/or the like. Additionally, or alternatively, a synchronization communication may be an SS block. For example, and as shown, wireless node 720 may determine a first set of resources (e.g., time and/or frequency resources, illustrated by white blocks) based at least in part on determining that wireless node 720 is connected to another wireless node. In this case, the first set of resources available for synchronization communications may be associated with a reference timing used by wireless node 720 and at least one other wireless node to which wireless node 720 is connected (e.g., wireless node 710 and/or wireless node 705).

As shown by reference number 740, wireless node 720 may select one or more resources from the set of available resources, and may transmit one or more synchronization communications using the selected one or more resources. For example, and as shown, wireless node 720 may select 4 resource blocks out of the illustrated 18 available resource blocks (e.g., illustrated as white blocks), and may transmit synchronization communication(s) using the 4 selected resource blocks. By coordinating selection of these resource blocks using a reference timing associated with a cluster of wireless nodes in communication with wireless node 720, wireless node 720 may maintain synchronization with other wireless nodes in the same cluster, thereby enhancing network performance and reliability.

In some aspects, a wireless node may select the one or more resources for transmission of synchronization communications based at least in part on a number of hops from the wireless node to an anchor node that is connected to a core network. Additionally, or alternatively, the wireless node may select the one or more resources based at least in part on an index that indicates resources allocated to the wireless node (e.g., as described above in connection with FIG. 6). Additionally, or alternatively, the wireless node may select the one or more resources based at least in part on a random seed. By using one or more of these techniques for selection of the one or more resources for transmission of synchronization communications, the wireless node may be more likely to select different resources than another wireless node included in the same cluster of wireless nodes, thereby reducing interference.

Additionally, or alternatively, a wireless node may select the one or more resources for transmission of synchronization communications based at least in part on one or more signals detected or measured on the set of resources. For example, the wireless node may select one or more resources with a lower signal energy, a lower signal power, and/or the like, as compared to other resources in the set of resources. In this way, the wireless node is more likely to select less crowded resources, thereby reducing interference.

Additionally, or alternatively, a wireless node may select the one or more resources for transmission of synchronization communications based at least in part on an explicit instruction from another device. For example, the wireless node may select the one or more resources based at least in part on an indication from an upper layer (e.g., a device in a core network), which may coordinate resource selection among a cluster of wireless nodes. Additionally, or alternatively, the wireless node may select the one or more resources based at least in part on a communication received from at least one other wireless node. For example, one or more other wireless nodes may indicate resources selected by those wireless node(s) for synchronization communications, and the wireless node may select the one or more resources based at least in part on the indication(s). In this way, the wireless node may be more likely to select different resources than another wireless node included in the same cluster of wireless nodes, thereby reducing interference.

Although aspects are described above in connection with wireless node 720, wireless node 705 and/or 710 may select one or more resources for transmission of synchronization communications in a similar manner, depending on the connectivity state of wireless node 705 and/or 710. For example, wireless node 705 may determine a connectivity state of wireless node 705. In some aspects, the connectivity state may indicate that wireless node 705 is connected to a core network (e.g., via a wired connection). For example, the connectivity state may indicate that the wireless node 705 is an anchor node. In some aspects, when the connectivity state indicates that a wireless node is connected to a core network and/or is an anchor node, then the set of available resources may be indicated by one or more devices of the core network. In this way, the core network can coordinate synchronization of multiple wireless nodes connected to the core network, thereby enhancing network performance and reliability.

In some aspects, a wireless node may indicate a connectivity state of the wireless node. For example, the wireless node may indicate the connectivity state in a synchronization signal, such as a PSS, an SSS, and/or the like. Additionally, or alternatively, the wireless node may indicate the connectivity state in a PBCH communication. Additionally, or alternatively, the wireless node may indicate the connectivity state using system information. Such system information may be carried in one or more of a master information block (MIB), a system information block (SIB), minimum system information (SI), other SI, and/or the like. Additionally, or alternatively, the wireless node may indicate the connectivity state in a radio resource control (RRC) signaling message. Such an indication may be used by a new wireless node joining the wireless network to select and/or prioritize a target wireless node with which a connection is to be established. Additionally, or alternatively, the wireless node may indicate the connectivity state in a medium access control (MAC) message, an upper layer message, and/or the like.

As shown in FIG. 7B, and by reference number 745, in some aspects, wireless node 720 may lose a connection with wireless node 710, thereby also losing a connection with wireless node 705 and the core network. In some aspects, the connection may be lost due to movement of a wireless node, movement of an object between wireless nodes, poor signal quality, environmental conditions, malfunctioning of a wireless node, and/or the like.

As shown by reference number 750, the wireless node 720 may determine a connectivity state of wireless node 720. In this case, the connectivity state of wireless node 720 may indicate that wireless node 720 has lost a connection with at least one other wireless node (e.g., wireless node 710) within a threshold time period. Additionally, or alternatively, the connectivity state may indicate that wireless node 720 has lost an indirect connection with an anchor node (e.g., wireless node 705) and/or a core network. Other connectivity states are possible, and will be described in more detail elsewhere herein.

As shown by reference number 755, wireless node 720 may determine a set of resources available for one or more synchronization communications based at least in part on the connectivity state of wireless node 720. As described above in connection with FIG. 7A, a first set of resources (e.g., time and/or frequency resources, illustrated by white blocks) may be associated with a reference timing followed by wireless node 720 and at least one other wireless node to which wireless node 720 was previously connected (e.g., wireless node 710 and/or wireless node 705). Because wireless node 720 was recently disconnected from wireless node 710 (e.g., within a threshold time period), wireless node 720 may determine a second set of resources available for transmission of synchronization signals, where the second set of resources (e.g., illustrated by shaded blocks) is different from the first set of resources (e.g., illustrated by white blocks). In some aspects, the second set of resources may not overlap with the first set of resources. Additionally, or alternatively, the second set of resources may have a fixed time offset or a fixed frequency offset from the first set of resources. In this way, wireless node 720 may avoid or reduce interference with synchronization communications from wireless nodes 710 and/or 705.

As shown by reference number 760, wireless node 720 may select one or more resources from the set of available resources, and may transmit one or more synchronization communications using the selected one or more resources. For example, and as shown, wireless node 720 may select 4 resource blocks out of the illustrated 12 available resource blocks (e.g., illustrated as shaded blocks), and may transmit synchronization communication(s) using the 4 selected resource blocks. By using different resource blocks than a cluster of wireless nodes 705, 710 with which wireless node 720 was recently in communication, wireless node 720 may reduce the likelihood of synchronization communication collision and/or interference.

In some aspects, the threshold amount of time may elapse, and wireless node 720 may remain disconnected from wireless nodes 710 and 705. In this case, the connectivity state may indicate that wireless node 720 is not connected to another wireless node via a wireless link. Additionally, or alternatively, the connectivity state may indicate that wireless node 720 has not been connected to another wireless node via a wireless link for a threshold amount of time. In this case, the wireless node 720 may determine the set of resources and/or may select one or more resources for transmission of synchronization communications based at least in part on a reference timing used by wireless node 720. In this case, because wireless node 720 is less likely to be synchronized with other wireless nodes (e.g., because wireless node 720 is isolated), the reference timing of wireless node 720 is more likely to be different than the reference timing(s) of nearby wireless nodes. Thus, if wireless node 720 uses a reference timing associated with wireless node 720 to select resources for transmission of synchronization communications, such communications are less likely to collide or interfere with communications from nearby wireless nodes.

Example connectivity states for determining a set of resources for synchronization communications have been described above. For example, as described above, the connectivity state may include an indication that a wireless node is connected to at least one other wireless node via a wireless link, an indication that a threshold amount of time has elapsed since the wireless node lost a connection with at least one other wireless node, an indication that a threshold amount of time has not elapsed since the wireless node lost a connection with at least one other wireless node, an indication that the wireless node is not connected to another wireless node via a wireless link, an indication that the wireless node is an anchor node that is connected to a core network, and/or the like.

Additionally, or alternatively, other connectivity states may be used to determine the set of resources available for synchronization communications. For example, the connectivity state may include an indication of a number of hops from a wireless node to an anchor node that is connected to a core network, a cluster identifier associated with a cluster of wireless nodes that includes the wireless node, an indication of whether the cluster of wireless nodes is connected to a core network, and/or the like. One or more of the connectivity states described herein may be used to determine the set of resources for synchronization communications such that a likelihood or amount of interference is reduced.

As indicated above, FIGS. 7A and 7B are provided as examples. Other examples are possible and may differ from what was described with regard to FIGS. 7A and 7B.

Figure 8:
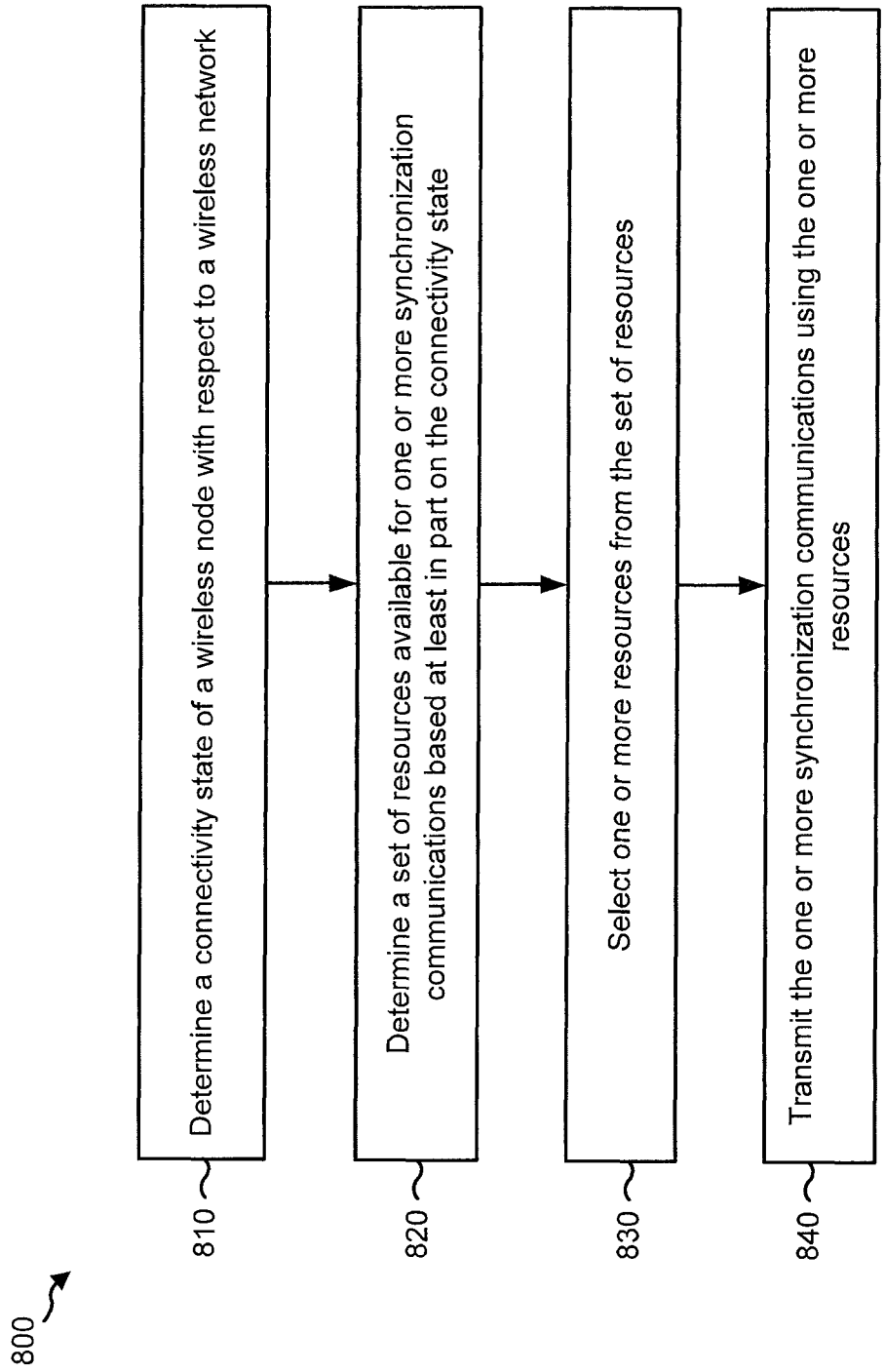
FIG. 8 is a diagram illustrating an example process performed, for example, by a wireless node, in accordance with various aspects of the present disclosure.

FIG. 8 is a diagram illustrating an example process 800 performed, for example, by a wireless node (e.g., a base station, a UE, and/or the like), in accordance with various aspects of the present disclosure.

As shown in FIG. 8, in some aspects, process 800 may include determining a connectivity state of a wireless node with respect to a wireless network (block 810). For example, a wireless node may determine a connectivity state of the wireless node with respect to a wireless network (e.g., a wireless backhaul network), as described in more detail above.

In some aspects, the connectivity state indicates that the wireless node is connected to at least one other wireless node via a wireless link of the wireless network. In some aspects, the connectivity state indicates that the wireless node has lost a connection with at least one other wireless node within a threshold time period. In some aspects, the connectivity state indicates that the wireless node is not connected to another wireless node via a wireless link. In some aspects, the connectivity state indicates that the wireless node has not been connected to another wireless node via a wireless link for a threshold amount of time. In some aspects, the connectivity state indicates that the wireless node is connected to a core network.

In some aspects, the connectivity state includes at least one of: an indication that the wireless node is connected to at least one other wireless node via a wireless link, an indication that a threshold amount of time has elapsed since the wireless node lost a connection with at least one other wireless node, an indication that a threshold amount of time has not elapsed since the wireless node lost a connection with at least one other wireless node, an indication that the wireless node is not connected to another wireless node via a wireless link, an indication that the wireless node is an anchor node that is connected to a core network, an indication of a number of hops from the wireless node to an anchor node that is connected to a core network, a cluster identifier associated with a cluster of wireless nodes that includes the wireless node, an indication of whether the cluster of wireless nodes is connected to a core network, or some combination thereof.

In some aspects, the wireless node may indicate the connectivity state using one or more of: a synchronization signal, a physical broadcast channel, system information carried in any combination of a master information block (MIB), a system information block (SIB), minimum system information (SI), or other SI, a radio resource control signaling message, a medium access control message, an upper layer message, or some combination thereof.

As further shown in FIG. 8, in some aspects, process 800 may include determining a set of resources available for one or more synchronization communications based at least in part on the connectivity state (block 820). For example, the wireless node may determine a set of resources available for one or more synchronization communications based at least in part on the connectivity state, as described in more detail above.

In some aspects, the set of resources is associated with a reference timing used by the wireless node and at least one other wireless node to which the wireless node is connected. In some aspects, the set of resources includes one or more second resources that are different from one or more first resources associated with a reference timing used by the wireless node and at least one other wireless node. In some aspects, the one or more second resources do not overlap with the one or more first resources. In some aspects, the one or more second resources have a fixed time offset or a fixed frequency offset from the one or more first resources. In some aspects, the set of resources is associated with a reference timing used by the wireless node. In some aspects, the set of resources is determined based on an indication by one or more devices of a core network.

As further shown in FIG. 8, in some aspects, process 800 may include selecting one or more resources from the set of resources (block 830). For example, the wireless node may select one or more resources, from the set of resources, for transmission of the one or more synchronization communications, as described in more detail above.

In some aspects, the one or more resources are selected based at least in part on one or more of: a number of hops from the wireless node to an anchor node that is connected to a core network, an index that indicates resources allocated to the wireless node, a random seed, one or more signals detected or measured on the set of resources, an indication from an upper layer, a communication received from the at least one other wireless node, or some combination thereof.

As further shown in FIG. 8, in some aspects, process 800 may include transmitting the one or more synchronization communications using the one or more resources (block 840). For example, the wireless node may transmit the one or more synchronization communications using the one or more resources, as described in more detail above.

In some aspects, the one or more synchronization communications include at least one of: a primary synchronization signal, a secondary synchronization signal, a physical broadcast channel communication, or some combination thereof. In some aspects, the one or more synchronization communications are one or more synchronization signal (SS) blocks.

In some aspects, the wireless node is a base station. In some aspects, the wireless node is a user equipment. In some aspects, the wireless node communicates via the wireless network using millimeter waves.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication, comprising:
determining, by a wireless node, a connectivity state of the wireless node with respect to a wireless network, wherein the connectivity states indicates: that a threshold amount of time has not elapsed since the wireless node lost a connection with at least one other wireless node, and one or more of: that the wireless node is an anchor node that is connected to a core network, or a number of hops from the wireless node to the anchor node that is connected to the core network; determining, by the wireless node, a set of resources available for one or more synchronization communications based at least in part on the connectivity state; selecting, by the wireless node, one or more resources from the set of resources using a reference timing associated with a cluster of wireless nodes in communication with the wireless node; and transmitting, by the wireless node, the one or more synchronization communications using the one or more resources.

2. The method of claim 1, wherein the connectivity state further indicates that the wireless node is connected to at least one other wireless node via a wireless link of the wireless network.

3. The method of claim 1, wherein the set of resources is associated with a reference timing used by the wireless node and at least one other wireless node to which the wireless node is connected.

4. The method of claim 1, wherein the set of resources includes one or more second resources that are different from one or more first resources associated with a reference timing used by the wireless node and at least one other wireless node.

5. The method of claim 4, wherein the one or more second resources do not overlap with the one or more first resources.

6. The method of claim 4, wherein the one or more second resources have a fixed time offset or a fixed frequency offset from the one or more first resources.

7. The method of claim 1, wherein the connectivity state further indicates that the wireless node is not connected to another wireless node via a wireless link.

8. The method of claim 1, wherein the connectivity state further indicates that the wireless node has not been connected to another wireless node via a wireless link for a threshold amount of time.

9. The method of claim 1, wherein the set of resources is associated with a reference timing used by the wireless node.

10. The method of claim 1, wherein the connectivity state further indicates that the wireless node is connected to a core network.

11. The method of claim 1, wherein the set of resources is determined based on an indication by one or more devices of a core network.

12. The method of claim 1, wherein the one or more resources are selected based at least in part on one or more of: the number of hops from the wireless node to the anchor node that is connected to the core network, an index that indicates resources allocated to the wireless node, a random seed, one or more signals detected or measured on the set of resources, an indication from an upper layer, a communication received from at least one other wireless node, or some combination thereof.

13. The method of claim 1, wherein the connectivity state further indicates at least one of: that the wireless node is connected to at least one other wireless node via a wireless link, that the wireless node is not connected to another wireless node via the wireless link, whether the cluster of wireless nodes is connected to the core network or some combination thereof.

14. The method of claim 1, wherein the method further comprises indicating the connectivity state using one or more of:
 a synchronization signal,
 a physical broadcast channel,
 system information carried in any combination of a master information block (MIB), a system information block (SIB), minimum system information (SI), or other SI,
 a radio resource control signaling message,
 a medium access control message,
 an upper layer message, or
 some combination thereof.

15. The method of claim 1, wherein the one or more synchronization communications include at least one of:
 a primary synchronization signal,
 a secondary synchronization signal,
 a physical broadcast channel communication, or
 some combination thereof.

16. The method of claim 1, wherein the one or more synchronization communications are one or more synchronization signal (SS) blocks.

17. The method of claim 1, wherein the wireless node is a base station.

18. The method of claim 1, wherein the wireless node is a user equipment.

19. The method of claim 1, wherein the wireless node communicates via the wireless network using millimeter waves.

20. A wireless node for wireless communication, comprising: memory; and one or more processors operatively coupled to the memory, the memory and the one or more processors configured to: determine a connectivity state of the wireless node with respect to a wireless network, wherein the connectivity states indicates: that a threshold amount of time has not elapsed since the wireless node lost a connection with at least one other wireless node, and one or more of: that the wireless node is an anchor node that is connected to a core network, or a number of hops from the wireless node to the anchor node that is connected to the core network; determine a set of resources available for one or more synchronization communications based at least in part on the connectivity state; select one or more resources from the set of resources using a reference timing associated with a cluster of wireless nodes in communication with the wireless node; and transmit the one or more synchronization communications using the one or more resources.

21. The wireless node of claim 20, wherein the connectivity state further indicates that the wireless node is connected to at least one particular wireless node via a wireless link of the wireless network, and wherein the set of resources is associated with a reference timing used by the wireless node and the at least one particular wireless node.

22. The wireless node of claim 20, wherein the set of resources includes one or more second resources that are different from one or more first resources associated with a reference timing used by the wireless node and at least one other wireless node.

23. The wireless node of claim 22, wherein the one or more second resources:
 do not overlap with the one or more first resources,
 have a fixed time offset or a fixed frequency offset from the one or more first resources, or
 some combination thereof.

24. The wireless node of claim 20, wherein the connectivity state further indicates that the wireless node is not connected to another wireless node via a wireless link, and wherein the set of resources is associated with a reference timing used by the wireless node.

25. The wireless node of claim 20, wherein the connectivity state further indicates that the wireless node is connected to the core network, and wherein the set of resources is determined based on an indication by one or more devices of the core network.

26. The wireless node of claim 20, wherein the one or more resources are selected based at least in part on one or more of: the number of hops from the wireless node to the anchor node that is connected to the core network, an index that indicates resources allocated to the wireless node, a random seed, one or more signals detected or measured on the set of resources, an indication from an upper layer, a communication received from at least one other wireless node, or some combination thereof.

27. The wireless node of claim 20, wherein the connectivity state further indicates at least one of: that the wireless node is connected to at least one other wireless node via a wireless link, that the wireless node is not connected to another wireless node via the wireless link, whether the cluster of wireless nodes is connected to the core network, or some combination thereof.

28. A non-transitory computer-readable medium storing one or more instructions for wireless communication, the one or more instructions comprising: one or more instructions that, when executed by one or more processors of a wireless node, cause the one or more processors to: determine a connectivity state of the wireless node with respect to a wireless network, wherein the connectivity states indicates: that a threshold amount of time has not elapsed since the wireless node lost a connection with at least one other wireless node, and one or more of: that the wireless node is an anchor node that is connected to a core network, or a number of hops from the wireless node to the anchor node that is connected to the core network; determine a set of resources available for one or more synchronization communications based at least in part on the connectivity state; select one or more resources from the set of resources using a reference timing associated with a cluster of wireless nodes in communication with the wireless node; and transmit the one or more synchronization communications using the one or more resources.

29. An apparatus for wireless communication, comprising: means for determining a connectivity state of the apparatus with respect to a wireless network, wherein the connectivity states indicates: that a threshold amount of time has not elapsed since the apparatus lost a connection with at least one other apparatus, and one or more of: that the apparatus is an anchor node that is connected to a core network, or a number of hops from the apparatus to the anchor node that is connected to the core network; means for determining a set of resources available for one or more synchronization communications based at least in part on the connectivity state; means for selecting one or more resources from the set of resources using a reference timing associated with a cluster of apparatuses in communication with the apparatus; and means for transmitting the one or more synchronization communications using the one or more resources.

30. The apparatus of claim 29, wherein the set of resources includes one or more second resources that are different from one or more first resources associated with a reference timing used by the apparatus and at least one other apparatus.

* * * * *